Nov. 20, 1951  F. J. WRIGHT  2,575,504
HOT PIN HEADING MACHINE
Filed Jan. 18, 1949  8 Sheets-Sheet 1

INVENTOR;
FRED J. WRIGHT,
BY
ATT'Y.

Nov. 20, 1951  F. J. WRIGHT  2,575,504
HOT PIN HEADING MACHINE
Filed Jan. 18, 1949  8 Sheets-Sheet 2
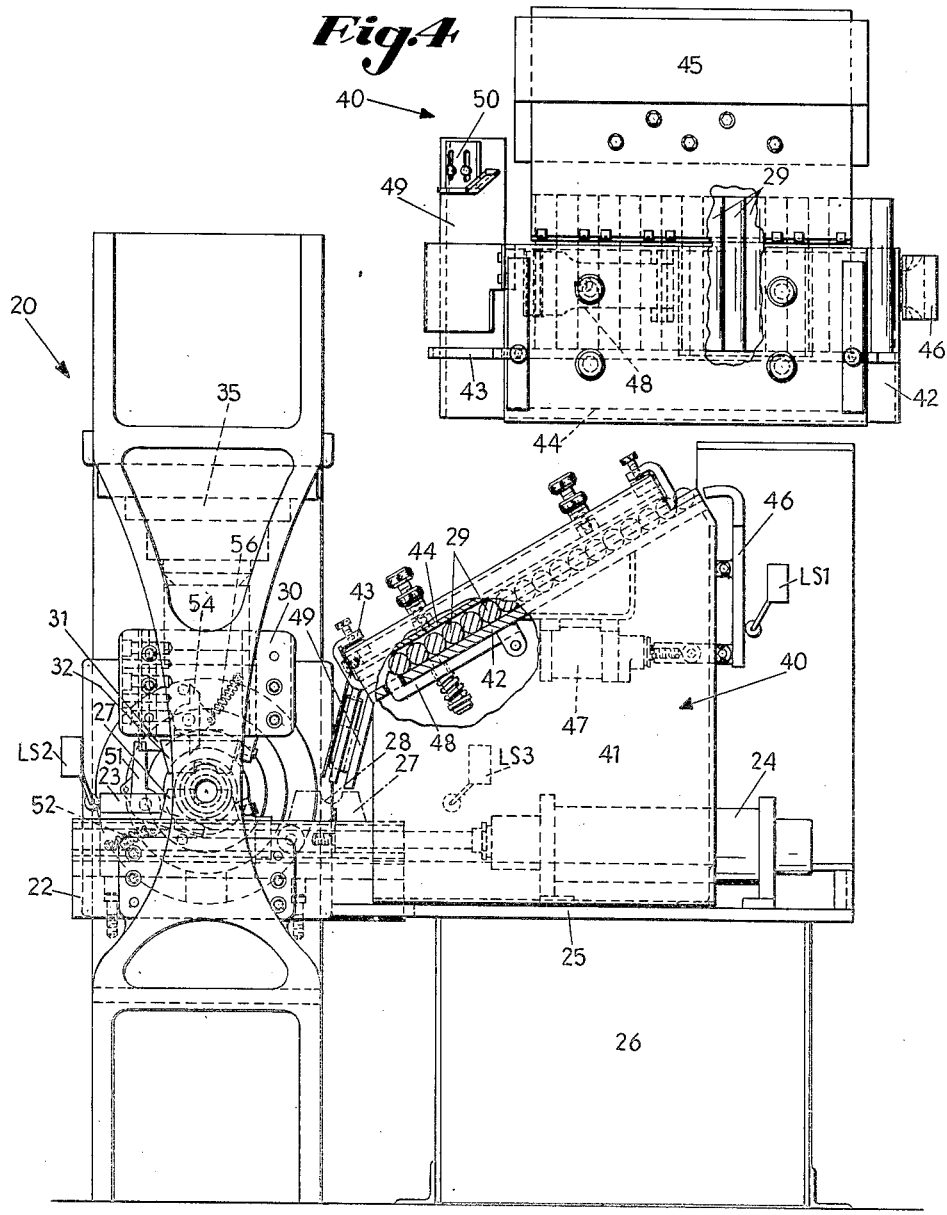
INVENTOR:
FRED J. WRIGHT,
BY
ATT'Y.

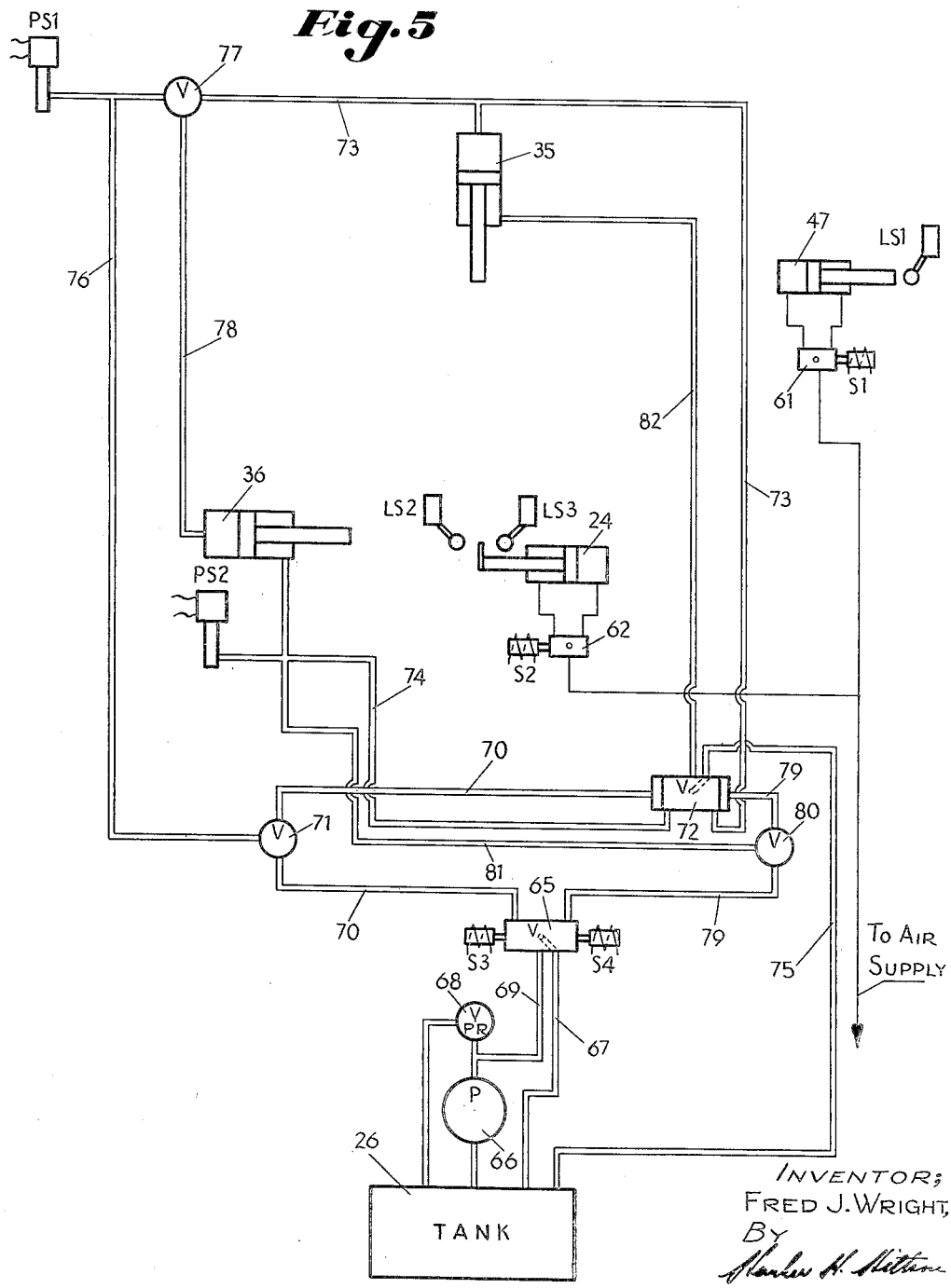

Nov. 20, 1951         F. J. WRIGHT         2,575,504
HOT PIN HEADING MACHINE
Filed Jan. 18, 1949         8 Sheets-Sheet 5

INVENTOR;
FRED J. WRIGHT,
BY
ATT'Y.

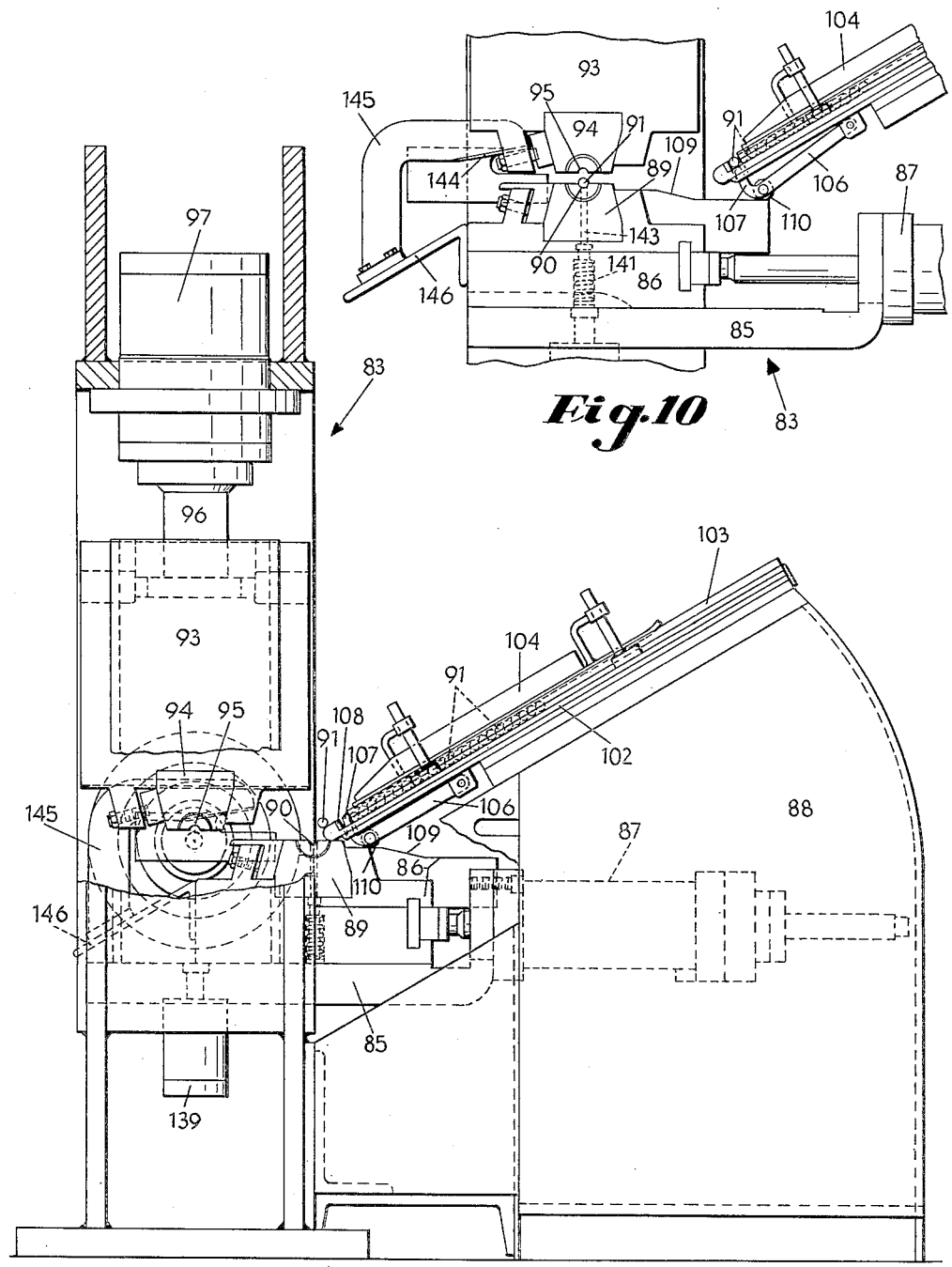

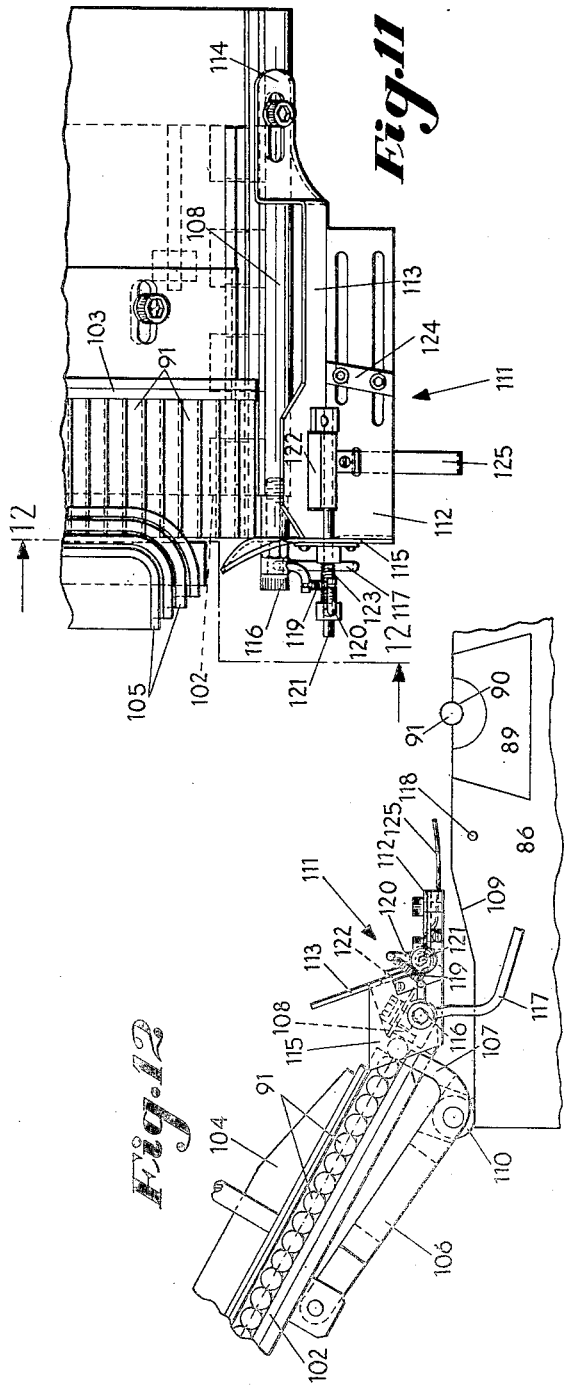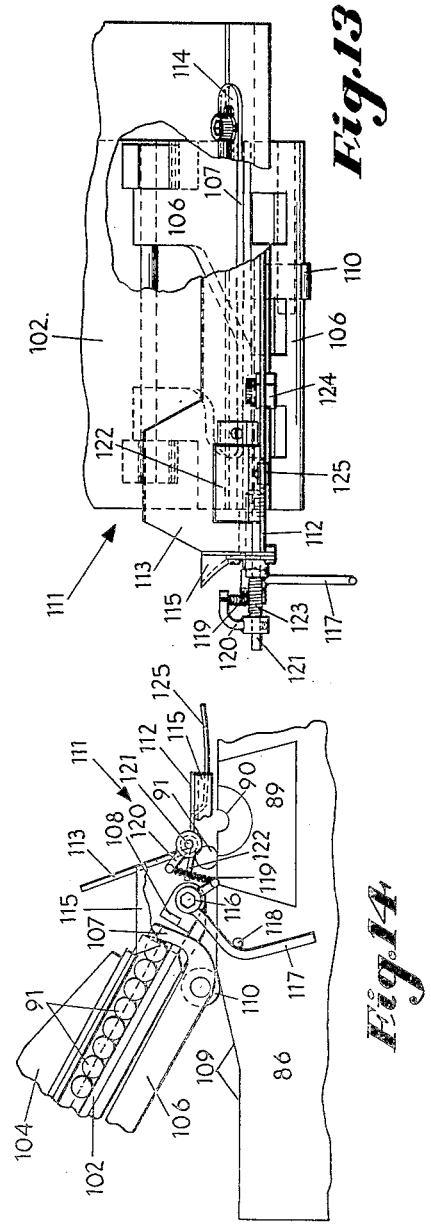

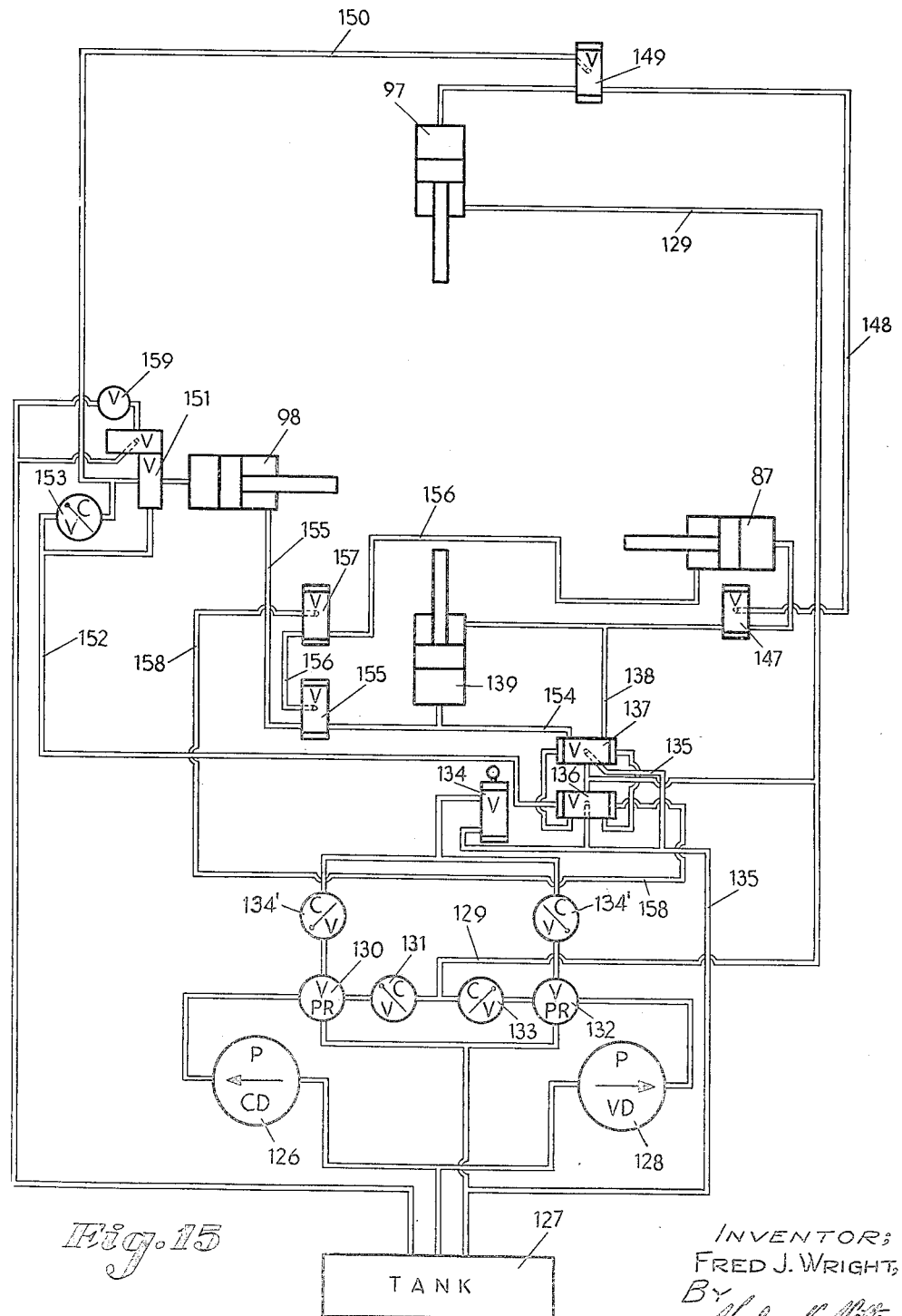

Patented Nov. 20, 1951

2,575,504

UNITED STATES PATENT OFFICE 2,575,504

HOT PIN HEADING MACHINE

Fred J. Wright, Columbus, Ohio, assignor to The Jeffrey Manufacturing Company, a corporation of Ohio Application January 18, 1949, Serial No. 71,465

13 Claims. (Cl. 10—11)

This invention relates to a pin heading machine adapted to take round bar stock of predetermined lengths, to heat one end thereof, and to form the heated end into a head, the machine being automatic in operation and merely requiring the feeding of the pins thereto.

An object of the invention therefore is to provide an improved machine of the above mentioned type in which various operations are performed to heat the pin at one end, carry the heated pin to dies, clamp it in position and then form a head on the heated end, thereafter ejecting it and repeating the operation, which is all automatically and continuously performed.

Other objects of the invention will appear hereinafter, the novel features and combinations being set forth in the appended claims.

In the accompanying drawings,

Fig. 2 is an elevational view of the machine taken at right angles to Fig. 1, with parts in section, showing the induction heating mechanism for the pins as well as the guiding and feeding means therefor, together with the clamping and heading dies;

Fig. 4 is a plan view showing particularly the induction heating mechanism for the pins to be headed;

Fig. 5 is a piping diagram of the hydraulic circuit of the machine of Figs. 1 to 4;

Fig. 8 is a view, generally similar to Fig. 2, of the modified machine, in which the induction pin heating mechanism is not shown;

Fig. 10 is a view showing the upper and lower clamping dies, a headed pin stripping device, and the mechanism for supporting and reciprocating the lower clamping die;

Fig. 11 is an enlarged plan view showing particularly a hold-down device for the pins and its association with the heating mechanism;

Fig. 12 is a side elevational view of the device of Fig. 11 and associated parts of the pin heading machine;

Fig. 13 is a front elevational view of the device of Figs. 11 and 12;

Fig. 14 is a view, similar to Fig. 12, with parts broken away, and with the lower die in a different position, showing particularly the operation of the hold-down mechanism in cooperation with a pin just prior to the pin's being received by the lower die; and Fig. 15 is a piping diagram of the pin heading machine of Figs. 7 to 10, inclusive.

Figure 3:
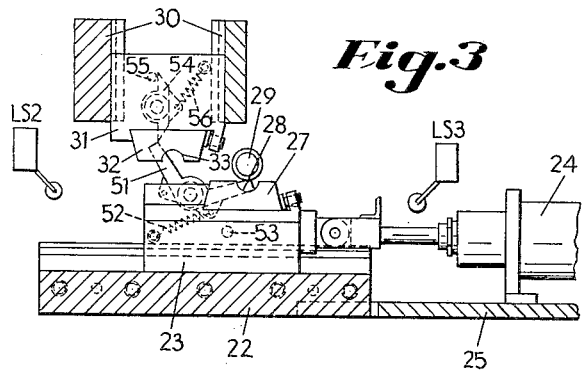
Fig. 3 is an enlarged sectional view showing particularly the relation of the holding dies and associated limit switches, together with the pin ejecting mechanism and the reciprocating carrier for the lower die.

In the accompanying drawings there are two specifically different machines disclosed, though they have certain important characteristics in common, while in other important characteristics they are different.

Referring first to the machine illustrated in Figs. 1, 2, 3 and 4 of the drawings, it includes a main frame 20 which includes a continuous encircling framework having a large central opening 21 within which the heading operation on the pins takes place. Rigidly attached to the main frame 20 and in the bottom of the opening 21 there is a supporting or guide block 22 formed of two parts, removably connected together, which receive and hold a reciprocating die block 23, which die block 23 is mounted for reciprocating motion. This reciprocating motion is supplied by a double acting air cylinder or motor 24 carried by a platform 25 which is rigidly connected to the top of a hydraulic tank 26, all of which is rigidly attached to the main frame 20.

The die block 23 carries a removable lower clamping die 27. It is evident that the die blocks 23 and lower clamping die 27 are adapted to reciprocate in a horizontal plane. The lower clamping die 27 is provided with a transverse semi-cylindrical pin receiving groove 28 adapted to receive a pin 29.

Above the guide block 22 and rigidly attached to the main frame 20 there is a vertical guide block 30 which receives and guides a die block 31 which is mounted therein between relatively removable parts, being carried on opposite sides thereof for vertical or up and down reciprocatory motion. Die block 31 carries a removable upper clamping die 32 on the bottom thereof, which clamping die 32 is provided with a semi-cylindrical pin receiving groove 33. The clamping dies 27 and 32 under one condition are adapted to be positioned so that the grooves 28 and 33 are in alignment and cooperate to effectuate a clamping of a pin 29 during a heading operation, as hereinafter described. The die block 31 is carried at the bottom of a piston head 34 of a double acting hydraulic cylinder or motor 35 carried adjacent the top of the main frame 20.

On one side the main frame 20 carries a double acting pin heading cylinder or motor 36 which has a heading tool or die 37 connected to the piston rod thereof, which tool or die 37 has a pin head forming recess 38 on the right hand or outer end thereof. The axis of the horizontal motor or cylinder 36 is through a vertical plane which bisects the groove 33 of die 32. In alignment with the heading tool 37 and on the opposite side of the dies 27 and 32 there is a bucking tool or head 39, carried by the main frame 20, which cooperates to take the axial thrust from a pin 29 while the head is being formed by the tool or die 37.

Adjacent one side of the main frame 20 and upon the platform 25 there is a combination pin heating and feeding mechanism 40 by which the unheaded pins are fed through an induction heater so that one end of them is heated so that a head may be formed thereon by the heading mechanism, a heated pin being carried to and received by the reciprocating lower clamping die tool 27 by which it is fed to a clamping and heading position, as hereinafter described more completely.

The pin heating and feeding mechanism 40 includes a frame 41 which is generally box type and has an upwardly sloping top plate 42. Pins 29 to be headed are guided along a chute provided by the feeding mechanism 40 which includes the top plate 42 upon which the pins are supported and slide, together with an adjustable pin guiding bar 43 which extends along one end of the pins 29 and adjacent which they generally abut while sliding over the plate 42.

As viewed in Fig. 4 of the drawings, there is an adjustable top guide plate 44 which loosely clamps the pins 29 in place while permitting their free sliding movement over the plate 42, simultaneously maintaining them in adjacent stacked positions as illustrated in Fig. 2 of the drawings. As viewed in Fig. 4 of the drawings, only approximately the lower two-thirds of each pin 29 rides on the plate 42 and is below the guide plate 44. The upper one-third of each pin, as viewed in said Fig. 4, (which is actually in a horizontal position), extends freely beyond the supporting plate 42 and the guide plate 44 and into a U-shaped longitudinal channel of an induction heating unit 45 so that one of the ends of each of the pins 29 is subject to high frequency electrical induction heating, as the pin travels from the top to the bottom of the plate 42, as hereinafter described. The heating unit 45 may be part of any standard high frequency induction electrical heating unit such as that sold under the trade name of "Tocco Jr." This type of heating is preferred because it tends to concentrate the heating of the pin at the head end which is to be upset to form a pin head.

The topmost of the pins 29 may be fed by hand or mechanically, as desired, as each heated pin is fed from the bottom of the stack. To feed a pin from the bottom of a stack a pivoted feed lever 46 is provided which is carried by the frame 41 and is actuated by a double acting air cylinder or motor 47 to push on the top pin 29 of the group of pins carried on the plate 42. This pushing on the top pin will provide sufficient force to force the lower pin 29 over a spring-pressed detent 48 which normally holds the pins 29 in the position illustrated in Fig. 2 of the drawings.

Whenever the lowermost pin 29 is released, as above stated, it will fall by gravity down a guide chute 49 which includes what is in effect an extension of the plate 42, an extension of the top guide plate 44, and an extension of the guide bar 43, together with an adjustable guide 50 which is adjacent the heated end of the pin 29. (See Fig. 4.)

The operation of the machine, together with various valves and limit switches controlled by it is described hereinafter in connection with the description of a complete cycle of operation which is described in conjunction with a description of Figs. 5 and 6 of the drawings.

It is evident, however, that the heading operation will take place on a pin 29 when it is clamped between the dies 27 and 32. When a pin 29 has been headed the die 32 will be lifted from the die 27 by elevating the die block 31, whereupon the die block 23 together with the die 27 will be reciprocated rearwardly, or at right angles to the axis of movement of die 32 and die block 31, to receive another heated pin. During this rearward or feeding reciprocating movement of the block 23 the headed pin 29 will be ejected by a bell crank lever 51 which is pivoted to the die block 23 about a horizontal axis and is biased by a spring 52 so that one arm of the lever 51 normally rests on a pin 53 also carried by the block 23. As the block 23 moves to the right, as viewed in Fig. 3, the normally upstanding arm of the lever 51 will be caught by one wing of a pivoted lever 54 which is pivotally attached to the upper die block 31 and has one wing normally held against a stop 55, carried by block 31, by a spring 56 attached at one end to said block 31.

During the reverse travel of the block 23 the upstanding arm of the bell crank lever 51, upon contacting the downwardly extending wing of the lever 54, will swing it against the tension of the spring 56 to re-set the ejecting mechanism.

Figure 6:
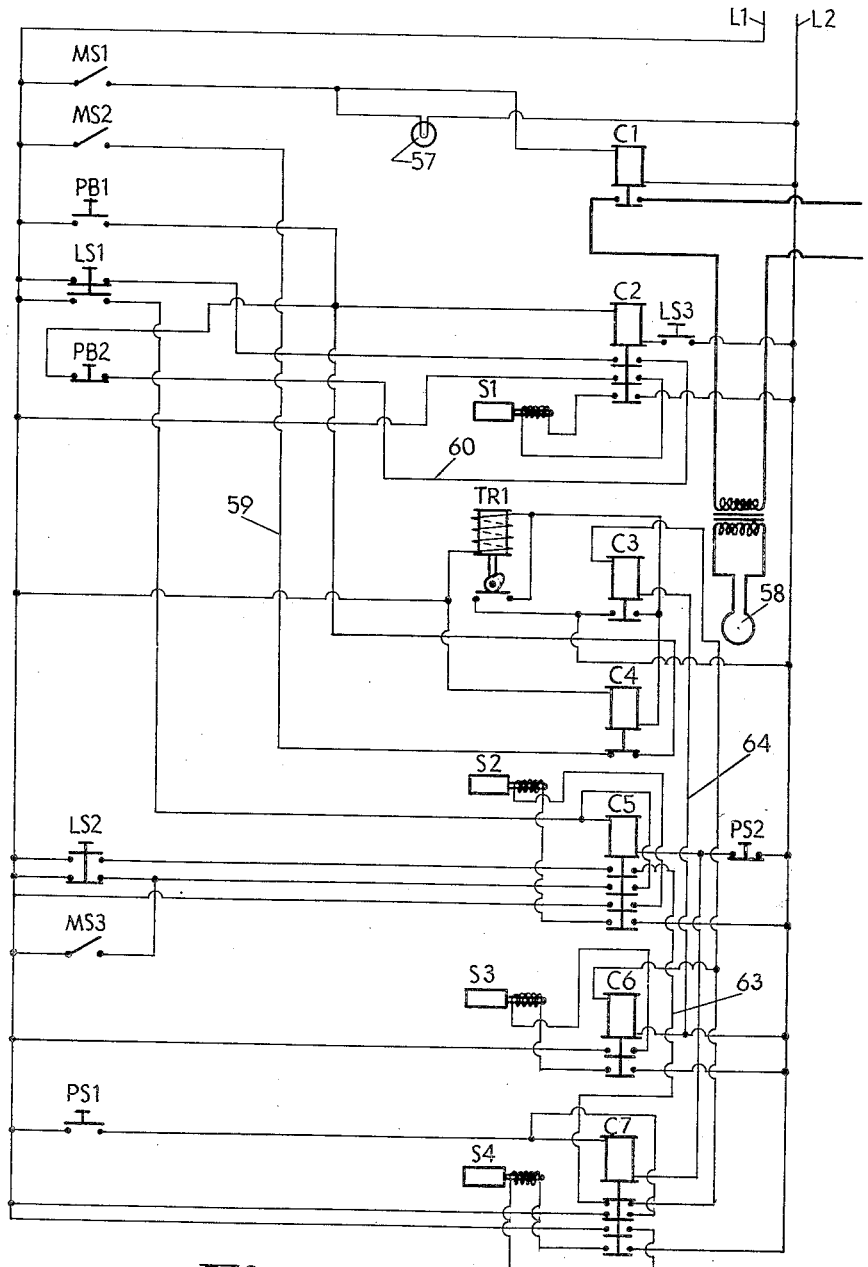
Fig. 6 is an electrical wiring diagram of the machine of Figs. 1 to 5.

Attention is now directed particularly to Figs. 5 and 6 of the drawings which will be described in connection with a complete cycle of operation of the complete unit. To start the unit in operation the switch MS1 (Fig. 6) is closed which energizes relay C1 over an obvious circuit from energized lines or conductors L1 and L2. A signal lamp 57 is energized when switch MS1 is closed, to designate its closed condition. Relay C1, on energizing, closes the circuit to the high frequency induction unit 58 through a step-up transformer, energy being derived from a high frequency source, such as the "Tocco Jr." unit previously mentioned.

Switch MS2 is then closed which energizes relay C2 over conductor 59 and the normally closed contacts of relay C4 and the contacts of a limit switch LS3, which limit switch LS3 is associated with and operated by the hydraulic cylinder or motor 24 when said cylinder or motor 24 is in its "out" or pin receiving position which is the physical relation of the mechanical parts at the start of a cycle of operation.

Relay C2, on energizing, closes a hold circuit for itself which extends from line L1 through the normally closed contacts of relay C2, thence by conductor 60 through the normally closed contacts of a push button PB2, thence to one terminal of the solenoid of relay C2.

At its lower contacts, relay C2, upon energizing, energizes solenoid S1 over an obvious circuit. Solenoid S1, on energizing, controls a valve 61 (see Fig. 5) so as to supply air under pressure to the head or left-hand end of cylinder 47 to cause its piston and piston rod to move to the right, as viewed in Figs. 2 and 5 of the drawings. This actuates the previously described feed lever 46 to feed the lower heated pin 29 down the guide or chute 49 into the lower clamping die 27 which is positioned directly below said chute 49 to receive it, as illustrated in dotted lines in Fig. 2 of the drawings.

Cylinder or motor 47, in operating, actuates switch LS1 which opens its normally closed contacts and closes its normally open contacts, the former breaking the above described holding circuit for relay C2, which thereupon drops out and de-energizes solenoid S1. The air valve 61 is biased so that when solenoid S1 is de-energized it moves automatically to divert the air to the piston rod or right-hand end of the cylinder 47 which will return the piston and piston rod thereof to its pin feeding position, as illustrated in Fig. 2 of the drawings.

The normally open contacts of switch LS1, on closing, energize relay C5 over an obvious circuit which includes the normally closed contacts of switch PS2 which is a pressure responsive switch in the hydraulic circuit, as hereinafter described. Relay C5, upon energizing, establishes a holding circuit for itself over the normally closed contacts of limit switch LS2 which is controlled by the die block 23.

The two lower contacts of the relay C5 close an obvious circuit to solenoid S2 to energize it. Solenoid S2 controls a valve 62 (see Fig. 5). The valve 62 thus being actuated delivers air under pressure to the double acting cylinder 24 to move it to the left, as viewed in Figs. 2, 3 and 5 of the drawings, which will feed the pin 29, carried in the lower die 27, inward or to the left, as viewed in said figures, until said die 27 is positioned directly below the die 32, with the two grooves 28 and 33 in alignment.

When the lower or bottom die 27 reaches its inward position, as above mentioned, the die block 23 will actuate limit switch LS2 to close its normally open contacts and open its normally closed contacts. Bridging the normally closed contacts of limit switch LS2 is a manual switch MS3. If switch MS3 is not now closed, relay C5 is de-energized, as is solenoid S2, and valve 62 is spring-biased so that it automatically reverses itself, causing cylinder 24 to reverse, which ejects this pin without heading it and positions the die 27 to receive another pin. This operation is desirable in case a pin 29 has been fed which has not been heated, as frequently will happen during the starting of the machine in operation.

For normal and automatic operation of the unit, switch MS3 will be closed. Under such conditions, relay C5 will have a holding circuit which extends through switch MS3 over an obvious conductor to the second contact from the top of said relay and through normally closed switch PS2. Under these conditions the lower die 27 will be held in its "in" position.

On closing the normally open contacts of limit switch LS2, as above described, relays C3 and C6 are energized in parallel over the now closed contacts of relay C5. The circuit for relay C6 is as follows: through the now closed normally opened contacts of limit switch LS2 over an abvious conductor to the upper now closed contacts of relay C5, thence by a conductor 63 to the normally closed upper contacts of relay C7, thence by an obvious conductor to relay C6, one side of the coil of which is connected directly to the line L2. The circuit for relay C3 is the same up to the conductor which branches off relay C6, which conductor is extended to one terminal of the winding of relay C3. The other terminal of the winding of relay C3 is extended by conductor 64 to the line L2.

Relay C6, on energizing, energizes solenoid S3 over both of its contacts. Solenoid S3 energizes a four-way hydraulic valve 65 (see Fig. 5) which when in its neutral position, to which it is spring-biased, provides a normal no-load by-pass for a hydraulic pump 66 which derives hydraulic fluid from the tank 26, the return flow from the by-pass into valve 65 being by way of pipe or conduit 67. A protective pressure relief valve 68 is also preferably provided for the pump 66.

When solenoid S3 is operated, as aforesaid, the hydraulic fluid delivered by the pump 66 to conduit, pipe or line 69 is delivered by conduit or pipe 70 through a sequence valve 71 to a fluid actuated four-way valve 72 which shifts its spool to connect the piston rod side of the cylinder 35 to conduit, pipe or line 73 which circulates the oil on the piston rod side of the cylinder 35 to the piston head side thereof to effect a speed-up operation thereof. Four-way valve 72, in operating, also connects a hydraulic pipe, conduit or line 74 to the tank conduit, pipe or line 75.

Sequence valve 71 will operate under a relatively low pressure, such as one hundred and fifty pounds per square inch which is adequate to shift the spool of four-way valve 72. As soon as this pressure is developed in the line 70, the hydraulic fluid therein will be diverted to pipe, conduit or line 76 and through sequence valve 77, flowing to the head end of cylinder 35 which expands, moving the die block 31 and upper clamping die 32 downward, clamping the pin 29 between the dies 27 and 32. In other words, this effects a clamping of a pin to be headed, between the upper and lower or top and bottom dies 27 and 32.

The sequence valve 77 will operate in response to relatively low pressure, such as two hundred and fifty pounds per square inch, which will be developed after cylinder 35 is expanded, as above set forth. The circulating circuit above described, provided by the four-way valve 72, will produce high speed operation of the cylinder 35.

Figure 1:
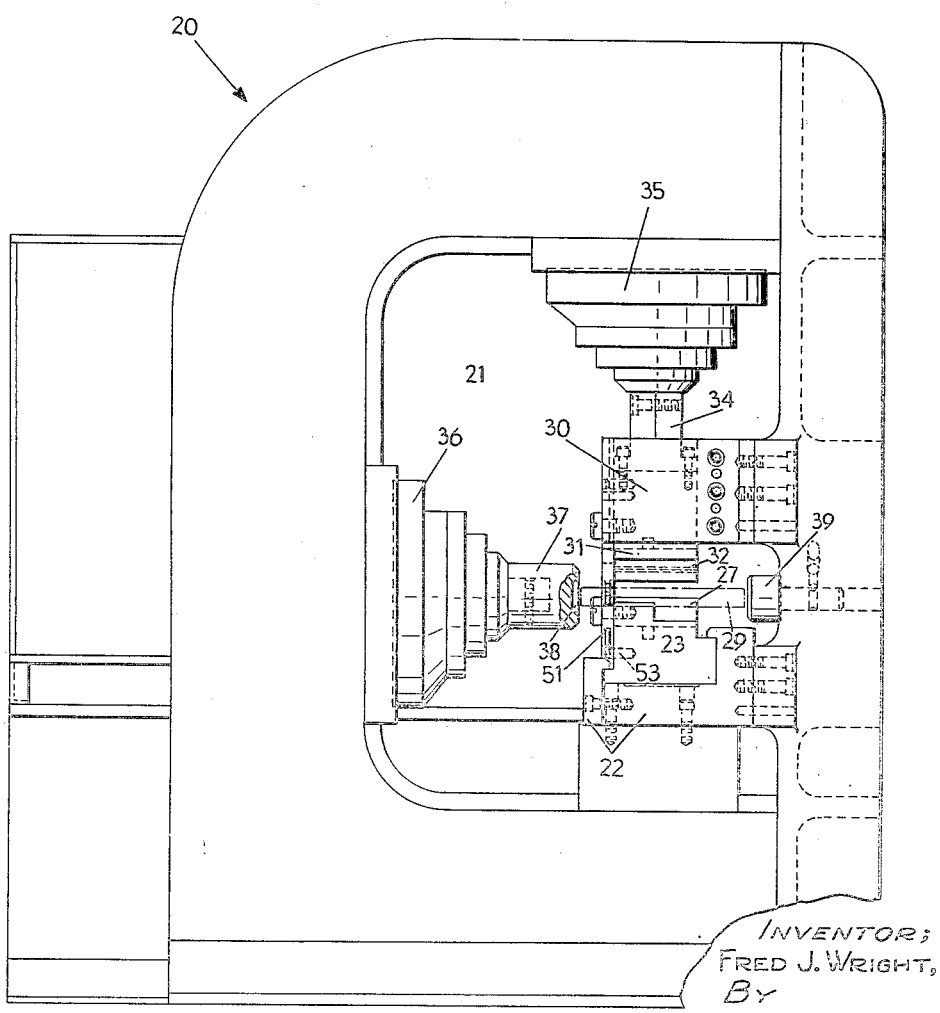
Fig. 1 is an elevational view showing one form of the pin heading machine involving my invention, with emphasis particularly on the clamping and head forming dies and actuating hydraulic cylinders therefor.

When sequence valve 77 opens, the hydraulic fluid in the line 76 will be diverted by way of pipe, conduit or line 78 to the head end of heading cylinder 36 which will move the piston rod and heading tool 37 to the right, as viewed in Figs. 1 and 5 of the drawings, forcing the heading tool 37 against the heated end of the pin 29, the opposite end of which will abut the bucking tool or head 39. At this time the piston rod end of the cylinder 36 is connected to tank over line 74.

It is intended that a relatively high pressure will be developed in lines 70, 76 and 78 during a heading operation and once the head is formed this pressure will actuate the pressure responsive switch PS1 which may be set to operate at a pressure in the neighborhood of two thousand pounds per square inch.

When the normally opened contacts of pressure switch PS1 are thus closed in response to the completion of a heading of the heated pin 29 which is clamped between the upper and lower dies 27 and 32, relay C7 (see Fig. 6) is energized over an obvious circuit including the normally closed contacts of pressure responsive switch PS2, which are now closed since this switch is connected to line 74 now connected to drain by fourway valve 72.

Relay C7, on energizing, closes a holding circuit over the second from the top contacts through pressure switch PS2. Relay C7, on energizing, de-energizes relays C6 and C3, the holding circuits of which extend over the upper normally closed contacts of said relay C7 as above described.

Relay C6, on de-energizing, de-energizes solenoid S3. Relay C3, on de-energizing, de-energizes relay C4, unless the timer contacts of a timer TR1 are closed, in which case relay C4 remains energized until the contacts of the timer TR1 are opened. Timer TR1 starts into operation when relay C3 is energized and continues in operation until it breaks its own contacts, the circuit for it being obvious by reference to Fig. 6 of the drawings.

When relay C7 is energized, as above mentioned, it also energizes solenoid S4 which controls the valve 65 (see Fig. 5) to reverse its position from that above described; this valve 65 being a self-centering spring-biased valve. Upon valve 65 being reversed by solenoid S4, pressure from the pump 66 is delivered over line 69 to pipe, conduit or line 79 through a sequence valve 80 which is similar to valve 71 and provides a free path to four-way valve 72 which is thereupon reversed. Sequence valve 80 then operates to deliver hydraulic fluid to pipe, conduit or line 81 which retracts cylinders 35 and 36, the former by way of pipe, conduit or line 82 which is now connected to conduit 74 by the four-way valve 72. Conduit 73 is now connected to tank conduit 75 by four-way valve 72 and a check valve built into sequence valve 77 connects conduit 78 to conduit 73 and ultimately to tank, thus providing for the ready retractive movement of the cylinders 35 and 36.

When the cylinders 35 and 36 are retracted, pressure in the line 81 will build up to operate the pressure responsive switch PS2 which may be set at a medium pressure, such as five hundred pounds per square inch. Switch PS2, on operating, opens its normally closed contacts and de-energizes relays C5 and C7. Relay C7, on de-energizing, de-energizes solenoid S4 and the main four-way valve 65 returns to its neutral position to which it is spring-biased, thus by-passing pump 66. Relay C5, on de-energizing, de-energies solenoid S2 which causes cylinder 24 to move the die block 23 and the lower or clamping die 27 to their "out" position, or, in other words, to their position adjacent the support and feed mechanism for the pins 29, where the die 27 is in position to receive another pin 29. When said die block 23 moves to this position, the contacts of switch LS3 are closed. This energizes relay C2 to start automatically the above described cycle all over again.

It is thus evident that once the unit is placed into operation it will continue automatically to head the pins 29, the only requirement being that they be continuously fed to the top of the pin heating and feeding mechanism 40 upon which they are supported and heated.

Attention is now directed to Figs. 7 through 10 and 15, showing a modified form of heading machine in which all of the controls are affected hydraulically, thus eliminating entirely the electrical system and eliminating the air operated cylinders, though, if desired, one or more of the cylinders may be air operated.

This particular embodiment of the invention includes a main frame 83 which includes a continuous encircling framework having a large central opening 84 within which the heading operation on the pins takes place. Rigidly attached to the main frame 83 and in the bottom of the opening 84 there is a supporting or guide block 85 formed of two parts (see Fig. 9) removably connected together, which receive and hold a reciprocating die block 86, which die block 86 is mounted for reciprocatory motion in a horizontal plane. This reciprocatory motion is supplied by a double acting hydraulic cylinder or motor 87 carried by a pin supporting frame 88 which is rigidly attached to the main frame 83.

The die block 86 carries a removable lower clamping die 89. The lower clamping die 89 is provided with a transverse semi-cylindrical pin receiving groove 90 adapted to receive a pin 91.

Above the guide block 85 and rigidly attached to the main frame 83 there is a vertical guide block 92 which receives and guides a die block 93 which is mounted therein between relatively removable parts, being carried on opposite sides thereof for vertical or up and down reciprocatory motion at right angles to the reciprocatory motion of the die block 86. Die block 93 carries a removable upper clamping die 94 on the bottom thereof, which clamping die 94 is provided with a semi-cylindrical pin receiving groove 95. The clamping dies 89 and 94 under one condition are adapted to be positioned so that the grooves 90 and 95 are in alignment (as illustrated in Fig. 10 of the drawings), whereupon they may be clamped together to effect a clamping of the pin 91 during a heading operation, as hereinafter described.

The die block 93 is carried at the bottom of a piston head 96 of a double acting hydraulic cylinder or motor 97 carried adjacent the top of the main frame 83. On one side the main frame 83 carries a double acting pin heading cylinder or motor 98 which has a heading tool or die 99 connected to the piston rod thereof, which tool or die 99 has a pin head forming recess 100 on the right-hand or outer end thereof.

The axis of the horizontal motor or cylinder 98 is through a vertical plane which bisects the groove 95 of the die 94. In alignment with the heading tool 99 and on the opposite side of the working portions of the dies 89 and 94, there is a bucking tool or head 101 carried by the main frame 83, which cooperates to take the axial thrust from a pin 91 while the head is being formed by the tool or die 99.

To one side of the main frame 83 and carried on the supporting frame 88 there is a downwardly sloping pin supporting plate 102 which constitutes part of a pin feeding, supporting and heating mechanism which in its general structure and function is similar to the pin heating and feeding mechanism 40 above described. It differs therefrom, however, in certain details which are evident from the drawings and from the description to follow.

As best seen by reference to Fig. 11 of the drawings, there is an adjustable guide plate 103 carried by the supporting plate 102 which guides the pins 91 as they slide by gravity down the inclined plate 102. An adjustable hold-down bar 104 (see Figs. 8, 12 and 14) is provided to hold the pins 91 on said plate 102. This bar is not shown in Figs. 11 and 13 of the drawings, in the interest of clearness.

The left-hand ends of the pins, as viewed in Fig. 11, project beyond the plate 102 and pass under the influence of the coils 105 of a high frequency induction heating unit which may be supplied with high frequency current from any desired source, such as the "Tocco Jr." unit.

Adjacent its forward end the plate 102 carries a pivoted feed arm 106 which has an upwardly extending head 107 which is positioned below the lowermost pin 91 and works between the lower end of the supporting plate 102 and a stop bar 108 which is carried by a bracket which forms in effect an extension of the pin supporting plate 102.

As clearly illustrated in Figs. 10 and 12 of the drawings, when the die block 86 and die 89 are in their "in" or pin clamping position the head 107 will rest beneath the lowermost pin 91. When the die block 86 is removed to its "out" or pin receiving position, as illustrated in Figs. 8 and 14 of the drawings, the cam surface 109 on the die block 86 cooperates with a roller 110 carried by the feed arm 106 to swing said feed arm about its pivot, thus moving the head 107 upwardly to push the pin over the stop bar 108 and allow it to roll into the pin groove 90 of the lower clamping die 89.

It has been found in practice that for some pins, depending upon their size and/or material, the pin is not always accurately received in the slot 90, with the mechanism as illustrated in Figs. 8 and 10 of the drawings. To overcome this difficulty, a pin hold-down mechanism 111, as disclosed in Figs. 11 to 14 of the drawings, was devised which constitutes the invention of Kenneth T. Davis. This particular mechanism is disclosed and claimed in application Serial No. 86,265, filed April 8, 1949, now Patent No. 2,554,664, dated May 29, 1951. However, since it is a desirable adjunct to the pin heading machine, under certain circumstances, it will be described in detail herein.

Pin hold-down mechanism 111 includes a generally horizontal body plate or frame 112 to which is connected an upwardly inclined integrally formed bracket and pin guide plate 113 having a wing 114 provided with an elongated slot adapted to be releasably connected to the stop bar 108 to support the plate 112, 113 at one end. Adjacent the other end there is a generally vertical guide plate 115 which has an outwardly flared top and which is rigidly attached to the left-hand end of the plates 112 and 113, as viewed in Fig. 11 of the drawings.

Guide plate 115 acts as a guide and abutment plate for the left-hand or heated ends of the pins 91, as viewed in Fig. 11, guiding said pins as they are ejected by the head 107 and rolled over the top of the stop bar 108. The guide plate 115 is punched to receive a pivot stud 116 which has a double function of attaching the left-hand end of the pin hold-down mechanism 111 to the stop bar 108 and providing a pivot to support a bell crank actuator 117. The actuator 117 has a downwardly extending curved arm which is adapted to be contacted by a pin 118 carried by the die block 86, as the die block 86 moves toward its outer or retracted position.

In Fig. 14 of the drawings the various parts are illustrated, in which feed arm 106 has been actuated by cam 109 to push a pin 91 over the stop bar 108, which pin 91 was then guided by the guide plate 113 as it rolled over the curved lowermost nose of the stop bar 108 and fell onto a flat surface on the top of the die block 86 or die 89.

The parts are so timed that substantially at the instant the pin drops on top of the die block 86, or of the die 89 which constitutes a continuation thereof, the bell crank 117 will have been sufficiently moved from its inactive position, as illustrated in Fig. 12, to its active position, as illustrated in Fig. 14, so as to stretch a helical spring 119 extending between the upper arm of the crank 117 and a pivoted lever 120 sufficient to swing the lever 120 from its inactive position of Fig. 12 to its active position of Fig. 14.

The lever 120 is rigidly attached to a pivot rod 121 pivotally mounted on the plate 112 and carrying a rigidly attached wing, butterfly or flapper 122. The flapper 122, when inactive, in effect constitutes a part of the plate 113. The plate 113, however, has an opening through which the flapper can swing on the pin 121 from the inactive position of Fig. 12 to the active position of Fig. 14.

Thus when a pin 91 has been dropped onto the die block 86 or the die 89, as above mentioned, spring 119 will be tensioned sufficiently so as to swing the flapper 122 down over the pin 91 and hold it down against the upper surface of said die block 86 or die 89. The flapper 122 is biased to its inactive position by a helical spring 123 which surrounds the pivot rod 121, being attached to the hub of the lever 120 at one end, and to a stationary journal box on the plate 115 at the other end.

The two springs 119 and 123 cooperate so that a snap action in both directions is imparted to the flapper 122. That is, as bell crank 117 is swung rearwardly, or to the left, as viewed in Figs. 12 and 14, spring 119 will be expanded until it has adequate force to overcome spring 123. Flapper 122 will then snap from its inactive position of Fig. 12 to its active position of Fig. 14. Any further rearward movement of the die block 86 will merely further expand spring 119 without significant effect.

Fig. 14 shows the relation of the parts just prior to the die block 86 reaching its rearmost or outer position and under these conditions the pin 91 thereon will be rolling over the surface of the die 89, being guided by the flapper 122 and by the plate 115 adjacent one end thereof. The other end is guided by an adjustable guide block 124 which is adjustably mounted on the horizontal plate 112.

When the die block 86 reaches its rearmost position a pin 91 will have been rolled into the groove 90 and as the die block 86 moves forwardly the parts will ultimately assume the positions illustrated in Fig. 12, with a pin 91 carried in the die 89, as illustrated in said Fig. 12. There is also a hold-down spring tongue 125 carried by the plate 112 and extending forwardly therefrom to hold the pin 91 in the groove 90 after said pin passes from under the plate 112.

The operation of the heading machine, together with its hydraulic control circuit, can best be understood by a description of one complete cycle of operation thereof. Referring to Fig. 15 of the drawings, wherein the hydraulic circuit is illustrated, it will be seen that there are two hydraulic pumps, one pump being designated 126 and constituting a constant delivery pump which derives hydraulic fluid, such as oil, from a tank 127. The other pump, designated 128, is a variable volume pump. By adjusting the volumetric output of the variable volume pump 128 the speed of operation of the system may be controlled.

The output of pump 126 is delivered to a pressure pipe, line or conduit 129 through a high pressure relief valve 130 which will spill to tank in response to excessive pressure. There is also a reverse flow check valve 131 interposed between relief valve 130 and conduit 129. A pressure relief valve 132 and a reverse flow check valve 133 are interposed between the variable delivery pump 128 and the pressure conduit 129.

Leading from each of the high pressure relief valves 130 and 132 there is a branch conduit which is connected to a manually operable unloading valve 134, there being a reverse flow check valve 134' in each of these branch conduits. A tank conduit or pipe 135 leads from the unloading valve 134. By operating the unloading valve 134 in one position, relief valves 130 and 132 become effective by-pass valves and by-pass the output of both the pumps 126 and 128 to tank. In the other position of the unloading valve 134, pressure relief valves 130 and 132 act as normal pressure relief valves. The unloading valve 134 can therefore be employed to stop the complete operation of the heading machine at any time and substantially instantaneously.

Under normal operating conditions hydraulic fluid will be delivered to the pressure conduit 129. Assuming that a pin 91 has just been received in the groove 90 of the lower clamping die 89 when it is in its "out" or pin receiving position and the die block 86 is ready to be shuttled forward or to its "in" position. Under these conditions the spools of two four-way valves 136 and 137 are in their left-hand positions, as viewed in Fig. 15.

Pressure from the pressure conduit 135 is therefore delivered to the two right-hand cylinder ports of these valves 136 and 137. Valve 136 is actually a control valve which controls the position of valve 137. Hydraulic fluid under pressure will therefore flow from valve 137 to line, pipe or conduit 138, to the top of a pin ejecting cylinder 139. The pin ejecting cylinder 139 is part of a pin ejecting mechanism which is best disclosed in Fig. 9 of the drawings. It constitutes a small cylinder which is fixed to the guide block 85 and has an actuating piston rod 140 which is in alignment with the groove 95 of the upper die 94.

The die block 86 carries a spring-pressed plunger 141 which is adapted to align itself with the piston rod 140 when the lower pin clamping die 89 is in its "in" position, or, in other words, the pin groove 90 is in alignment with the groove 95, as illustrated in Fig. 10 of the drawings.

Figure 9:
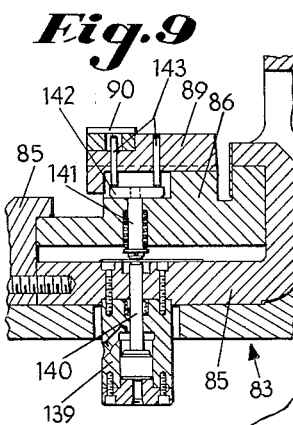
Fig. 9 is an enlarged sectional view showing the ejecting mechanism of the machine of Figs. 7 and 8.
Figure 7:
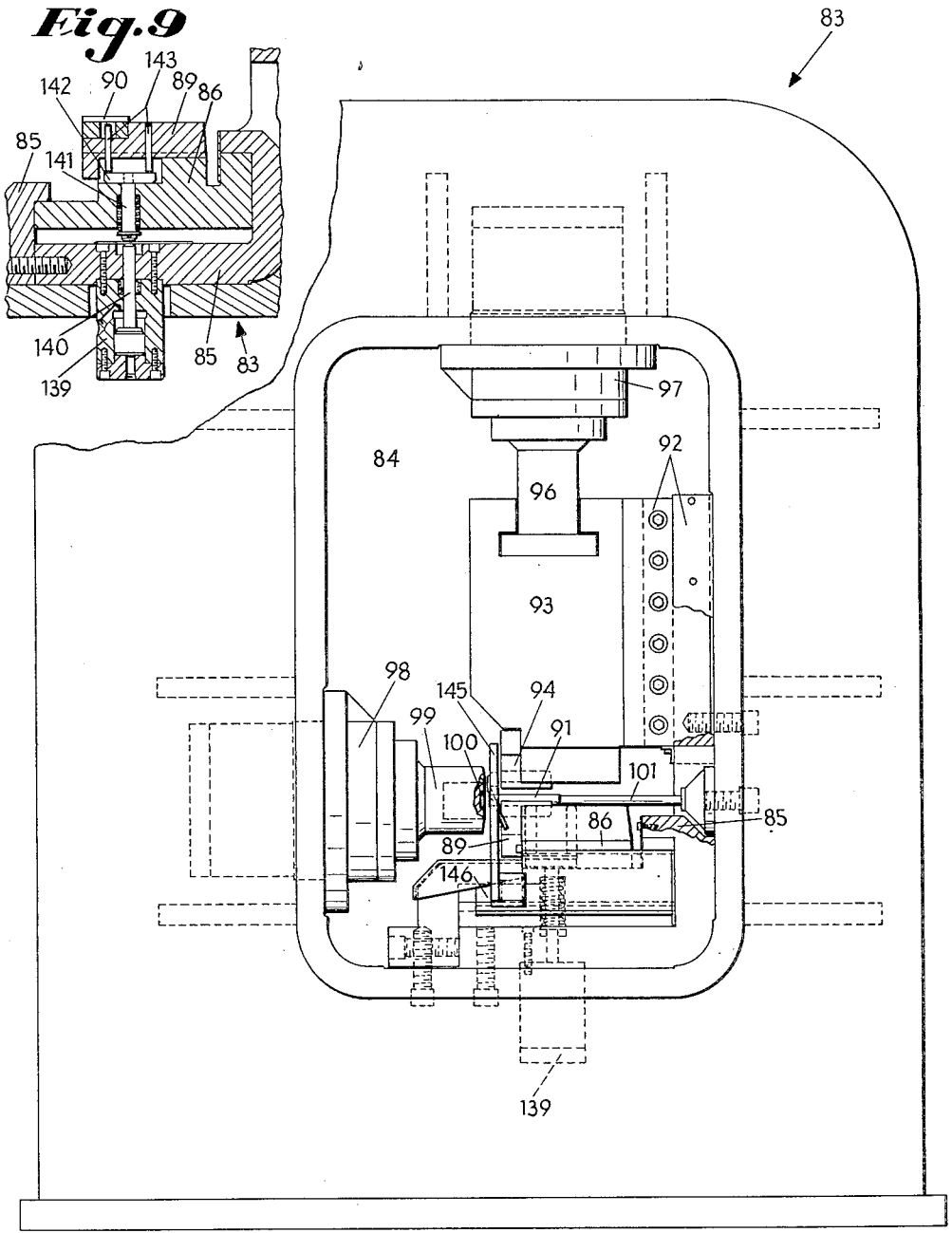
Fig. 7 is a view, similar to Fig. 1, of a modified form of pin heading machine.

Plunger 141 preferably carries a cross-head 142 which cooperates with one or more pins 143 which project through the bottom of the groove 90 in the die 89. As illustrated in Fig. 9 of the drawings, the die 89 has a removable insert portion over part of its length which may or may not be employed. In some instances it has been found desirable to make this insert portion of very high tensile steel and to make it separate. In other cases, this has not been found necessary.

In any event, the pins 143, or at least one of them, when moved upwardly, will contact any pin 91 in the groove 90 and push it upwardly, preferably with the upward movement of the upper clamping die 94, holding it in the groove 95 thereof until the pin 91 is rolled over the upper surface of the die 89, as said die 89 moves to its "out" or right-hand position, as viewed in Figs. 8 and 10. The effect of this, of course, is to hold the pin in the upper groove 95 until the groove 90 moves from under it, whereupon the pin will roll over the upper surface of the die 89 while being held in the groove 95; the dies 89 and 94 preferably separating only an amount sufficient to produce this action. As a consequence, as the die block 86 moves to the right from the position illustrated in Fig. 10, the removed pin 91 will roll off the left-hand end of the upper surface of the die block 86.

Should there be any tendency for the pin 91 to stick in the upper groove 95, it will be ejected by an ejecting cam 144 carried by an arm 145 which is attached to a bracket 146 which in turn is attached to the die block 86. The cam 144 will contact the head of any pin 91 which tends to stick in the groove 95 and eject it, causing the pin to fall on the bracket 146 which constitutes a downwardly sloping chute over which the headed pins can roll from the machine into any desired receptacle.

Reverting to a consideration of the hydraulic system of Fig. 15 and its operation, simultaneously with the contraction of ejecting cylinder 139, hydraulic fluid under pressure is also delivered through a sequence valve 147 to the head end of free cylinder 87, causing the die block 86 and the lower clamping die 89 to shuttle to its "in" or heading and clamping position. At the end of its stroke, pressure will develop in line 138 to actuate sequence valve 147 which will be a relatively low pressure, such as one hundred and fifty pounds per square inch.

Sequence valve 147, on operating, will deliver the hydraulic fluid under pressure to line, pipe or conduit 148 which flows through sequence valve 149 to the head end or top of clamp cylinder 97, forcing the die block 93 and the upper clamping die 94 downward to clamp a pin 91 between the two dies 89 and 94.

When pressure in the line 148 reaches a predetermined value, such as one hundred and fifty pounds per square inch, sequence valve 149 will open, delivering the hydraulic fluid to line, pipe or conduit 150 and by it to the head end of the heading cylinder 98 through sequence valve 151. Heading cylinder 98, upon operating, will force the die 99 against the heated end of the pin 91 which is clamped between the clamping dies 89 and 94 and form a head on it.

When the pressure in the line 150 builds up to a relatively high value, such as fifteen hundred pounds per square inch, the sequence valve 151 will divert the hydraulic fluid to line, pipe or conduit 152 which is connected with conduit 150 through a reverse flow check valve 153.

The high pressure fluid in the line 152 is delivered to the left-hand end of valve 136 which reverses the spool thereof, thus delivering fluid from the pressure line 135 to the left-hand end of the valve or spool 137, also reversing it. Fluid pressure is then delivered from conduit 135 by valve 137 to line, pipe or conduit 154 which operates the pin ejecting cylinder 139 to push the headed pin 91 upwardly, or, in other words, maintain it in the upper groove 95 of die 94, as said die 94 moves upward, as hereinafter described.

The fluid in conduit or pipe 154 flows through sequence valve 155 to the piston rod end of the cylinder 98 to retract it. When pressure builds up in this line 154 to a predetermined value, which may be relatively low, such as one hundred and fifty pounds per square inch, oil is delivered through pipe, line or conduit 156, to the piston rod end of the shuttle or feed cylinder 87 through sequence valve 157, causing the cylinder 87 to move outwardly or to the right, thus shuttling the guide block 86 and/or clamping die 89 to the pin receiving position.

When the valve 137 was actuated to the right, as above described, the constant fluid pressure in the line 129, which is delivered to the piston rod end of the cylinder 97, immediately moved it upward together with the die block 93 and die 94, since the line or conduit 148 is now connected to drain through the sequence valve 147 which provides a free reverse flow between conduit 148 and conduit 138; conduit 138 under these circumstances being connected by four-way valve 137 to drain line 135.

When the sequence valve 157 is actuated, upon the cylinder 87 reaching its outermost position of travel, the hydraulic fluid is delivered to conduit, pipe or line 156 to reverse the spool of valve 136, moving it to the left, which effects movement of the four-way valve 137 to the left, thus starting a new cycle of operation.

Associated with the previously described sequence valve 151 is a needle valve 159 which vents valve 151 so that it will operate at a low pressure rather than a high pressure. This is desirable whenever a pin 91 is clamped in the two dies 89 and 94, which has not been heated, thus allowing the pin to be discharged without applying a heading pressure to the tool 99 through cylinder 98. This operation is generally required when the unit is first placed in operation, since there will be a number of pins which have not been heated or adequately heated to effect the heading operation.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A pin heading machine including means supporting a row of pins, means for heating one end of each pin by electrical induction, relatively movable upper and lower pin clamping means having alignable pin receiving grooves cooperating to clamp a pin, power operated means for reciprocating said upper pin clamping means upwardly and downwardly, power operated means for reciprocating said lower pin clamping means between two extreme positions in one of which the pin receiving grooves of said upper and lower pin clamping means are in alignment and in the other of which the lower pin clamping means is in a position to receive a pin from said pin supporting means, power operated means for feeding one pin at a time from said pin supporting means to said lower pin clamping means while it is in said pin receiving position, means for actuating the second named power operated means to move it and a received pin from its pin receiving position to its position where the pin receiving groove thereof is in alignment with the pin receiving groove of the upper pin clamping means while said upper clamping means is elevated, means operable then to actuate the first named power operated means to lower said upper pin clamping means into pin clamping position, heading die means operable rectilinearly along the axis of said pin to form a head on said pin, actuating means operable thereafter in sequence first to operate the first named power operated means to elevate said upper pin clamping means and second to operate the second named power operated means to move said lower pin clamping means to its pin receiving position, and mechanism operable in response to said second operation to eject the headed pin from the slot of said lower pin clamping means.

2. A pin heading machine including means supporting a row of pins, means for heating one end of each pin by electrical induction, relatively movable upper and lower pin clamping means having alignable pin receiving grooves cooperating to clamp a pin, power operated means for reciprocating said upper pin clamping means upwardly and downwardly, power operated means for reciprocating said lower pin clamping means between two extreme positions in one of which the pin receiving grooves of said upper and lower pin clamping means are in alignment and in the other of which the lower pin clamping means is in a position to receive a pin from said pin supporting means, power operated means for feeding one pin at a time from said pin supporting means to said lower pin clamping means while it is in said pin receiving position, means for actuating the second named power operated means to move it and a received pin from its pin receiving position to its position where the pin receiving groove thereof is in alignment with the pin receiving groove of the upper pin clamping means while said upper clamping means is elevated, means operable then to actuate the first named power operated means to lower said upper pin clamping means into pin clamping position, heading die means operable rectilinearly along the axis of said pin to form a head on said pin, and actuating means operable thereafter in sequence first to operate the first named power operated means to elevate said upper pin clamping means and second to operate the second named power operated means to move said lower pin clamping means to its pin receiving position.

3. A pin heading machine including means supporting a row of pins, means for heating one end of each pin, relatively movable upper and lower pin clamping means having alignable pin receiving grooves cooperating to clamp a pin, power operated means for reciprocating said upper pin clamping means upwardly and downwardly, power operated means for reciprocating said lower pin clamping means between two extreme positions in one of which the pin receiving grooves of said upper and lower pin clamping means are in alignment and in the other of which the lower pin clamping means is in a position to receive a pin from said pin supporting means, power operated means for feeding one pin at a time from said pin supporting means to said lower pin clamping means while it is in said pin receiving position, means for actuating the second named power operated means to move it and a received pin from its pin receiving position to its position where the pin receiving groove thereof is in alignment with the pin receiving groove of the upper pin clamping means while said upper clamping means is elevated, means operable then to actuate the first named power operated means to lower said upper pin clamping means into pin clamping position, heading die means operable rectilinearly along the axis of said pin, actuating means operable thereafter in sequence first to operate the first named power operated means to elevate said upper pin clamping means and second to operate the second named power operated means to move said lower pin clamping means to its pin receiving position, and mechanism operable in response to said second operation to eject the headed pin from the slot of said lower pin clamping means.

4. A pin heading machine including means supporting a row of pins, means for heating one end of each pin, relatively movable upper and lower pin clamping means having alignable pin receiving grooves cooperating to clamp a pin, power operated means for reciprocating said upper pin clamping means upwardly and downwardly, power operated means for reciprocating said lower pin clamping means between two extreme positions in one of which the pin receiving grooves of said upper and lower pin clamping means are in alignment and in the other of which the lower pin clamping means is in a position to receive a pin from said pin supporting means, power operated means for feeding one pin at a time from said pin supporting means to said lower pin clamping means while it is in said pin receiving position, means for actuating the second named power operated means to move it and a received pin from its pin receiving position to its position where the pin receiving groove thereof is in alignment with the pin receiving groove of the upper pin clamping means while said upper clamping means is elevated, means operable then to actuate the first named power operated means to lower said upper pin clamping means into pin clamping position, heading die means operable rectilinearly along the axis of said pin to form a head on said pin, and actuating means operable thereafter in sequence first to operate the first named power operated means to elevate said upper pin clamping means and second to operate the second named power operated means to move said lower pin clamping means to its pin receiving position.

5. A pin heading machine including means supporting a row of pins, means for heating one end of each pin, relatively movable upper and lower pin clamping means having alignable pin receiving grooves cooperating to clamp a pin, power operated means for reciprocating said upper pin clamping means upwardly and downwardly, power operated means for reciprocating said lower pin clamping means between two extreme positions in one of which the pin receiving grooves of said upper and lower pin clamping means are in alignment and in the other of which the lower pin clamping means is in a position to receive a pin from said pin supporting means, power operated means for feeding one pin at a time from said pin supporting means to said lower pin clamping means while it is in said pin receiving position, means for actuating the second named power operated means to move it and a received pin from its pin receiving position to its position where the pin receiving groove thereof is in alignment with the pin receiving groove of the upper pin clamping means while said upper clamping means is elevated, means operable then to actuate the first named power operated means to lower said upper pin clamping means into pin clamping position, heading die means operable rectilinearly along the axis of said pin to form a head on said pin, actuating means operable thereafter in sequence first to operate the first named power operated means to elevate said upper pin clamping means and second to operate the second named power operated means to move said lower pin clamping means to its pin receiving position, and mechanism operable while said lower pin clamping means is in the aligned groove position to push a pin upwardly with the upward elevating movement of said upper pin clamping means.

6. A pin heading machine including means supporting a row of pins, means for heating one end of each pin, relatively movable upper and lower pin clamping means having alignable pin receiving grooves cooperating to clamp a pin, power operated means for reciprocating said upper pin clamping means upwardly and downwardly, power operated means for reciprocating said lower pin clamping means between two extreme positions in one of which the pin receiving grooves of said upper and lower pin clamping means are in alignment and in the other of which the lower pin clamping means is in a position to receive a pin from said pin supporting means, power operated means for feeding one pin at a time from said pin supporting means to said lower pin clamping means while it is in said pin receiving position, means for actuating the second named power operated means to move it and a received pin from its pin receiving position to its position where the pin receiving groove thereof is in alignment with the pin receiving groove of the upper pin clamping means while said upper clamping means is elevated, means operable then to actuate the first named power operated means to lower said upper pin clamping means into pin clamping position, heading die means operable rectilinearly along the axis of said pin to form a head on said pin, actuating means operable thereafter in sequence first to operate the first named power operated means to elevate said upper pin clamping means and second to operate the second named power operated means to move said lower pin clamping means to its pin receiving position, mechanism operable while said lower pin clamping means is in the aligned groove position to push a pin upwardly with the upward elevating movement of said upper pin clamping means, and means to strip a pin from the upper pin clamping means.

7. A pin heading machine including means supporting a row of pins, relatively movable upper and lower pin clamping means having alignable pin receiving grooves cooperating to clamp a pin, power operated means for reciprocating said upper pin clamping means upwardly and downwardly, power operated means for reciprocating said lower pin clamping means between two extreme positions in one of which the pin receiving grooves of said upper and lower pin clamping means are in alignment and in the other of which the lower pin clamping means is in a position to receive a pin from said pin supporting means, power operated means for feeding one pin at a time from said pin supporting means to said lower pin clamping means while it is in said pin receiving position, means for actuating the second named power operated means to move it and a received pin from its pin receiving position to its position where the pin receiving groove thereof is in alignment with the pin receiving groove of the upper pin clamping means while said upper clamping means is elevated, means operable then to actuate the first named power operated means to lower said upper pin clamping means into pin clamping position, heading die means operable rectilinearly along the axis of said pin to form a head on said pin, actuating means operable thereafter in sequence first to operate the first named power operated means to elevate said upper pin clamping means and second to operate the second named power operated means to move said lower pin clamping means to its pin receiving position, and mechanism operable in response to said second operation to eject the headed pin from the slot of said lower pin clamping means.

8. A pin heading machine including means supporting a row of pins, relatively movable upper and lower pin clamping means having alignable pin receiving grooves cooperating to clamp a pin, power operated means for reciprocating said upper pin clamping means upwardly and downwardly, power operated means for reciprocating said lower pin clamping means between two extreme positions in one of which the pin receiving grooves of said upper and lower pin clamping means are in alignment and in the other of which the lower pin clamping means is in a position to receive a pin from said pin supporting means, power operated means for feeding one pin at a time from said pin supporting means to said lower pin clamping means while it is in said pin receiving position, means for actuating the second named power operated means to move it and a received pin from its pin receiving position to its position where the pin receiving groove thereof is in alignment with the pin receiving groove of the upper pin clamping means while said upper clamping means is elevated, means operable then to actuate the first named power operated means to lower said upper pin clamping means into pin clamping position, heading die means operable rectilinearly along the axis of said pin to form a head on said pin, and actuating means operable thereafter in sequence first to operate the first named power operated means to elevate said upper pin clamping means and second to operate the second named power operated means to move said lower pin clamping means to its pin receiving position.

9. A pin heading machine including a frame, a top clamping cylinder on the top of said frame and extending downwardly into said opening, a vertically reciprocal clamping member on the bottom of said top clamping cylinder, a horizontally reciprocable clamping member adjustable into clamping aligned position with said first named clamping member and adjustable into a pin receiving position out of alignment with said first clamping member, and a heading die member in alignment with said first clamping member reciprocable at right angles to the direction of reciprocation of said horizontally reciprocable clamping member adapted to head a pin held between said clamping dies.

10. A pin heading machine including means supporting a row of pins, means for heating one end of each pin by electrical induction, relatively movable upper and lower pin clamping means having alignable pin receiving grooves cooperating to clamp a pin, power operated means for reciprocating said upper pin clamping means upwardly and downwardly, power operated means for reciprocating said lower pin clamping means between two extreme positions in one of which the pin receiving grooves of said upper and lower pin clamping means are in alignment and in the other of which the lower pin clamping means is in a position to receive a pin from said pin supporting means, power operated means for feeding one pin at a time from said pin supporting means to said lower pin clamping means while it is in said pin receiving position, means for actuating the second named power operated means to move it and a received pin from its pin receiving position to its position where the pin receiving groove thereof is in alignment with the pin receiving groove of the upper pin clamping means while said upper clamping means is elevated, means operable then to actuate the first named power operated means to lower said upper pin clamping means into pin clamping position, heading die means operable rectilinearly along the axis of said pin to form a head on said pin, actuating means operable thereafter in sequence first to operate the first named power operated means to elevate said upper pin clamping means and second to operate the second named power operated means to move said lower pin clamping means to its pin receiving position, and means for removing said pin from said lower clamping means after said first-named power operated means is elevated, including an ejector.

11. A pin heading machine including means supporting a row of pins, means for heating one end of each pin, relatively movable upper and lower pin clamping means having alignable pin receiving grooves cooperating to clamp a pin, power operated means for reciprocating said upper pin clamping means upwardly and downwardly, power operated means for reciprocating said lower pin clamping means between two extreme positions in one of which the pin receiving grooves of said upper and lower pin clamping means are in alignment and in the other of which the lower pin clamping means is in a position to receive a pin from said pin supporting means, power operated means for feeding one pin at a time from said pin supporting means to said lower pin clamping means while it is in said pin receiving position, means for actuating the second named power operated means to move it and a received pin from its pin receiving position to its position where the pin receiving groove thereof is in alignment with the pin receiving groove of the upper pin clamping means while said upper clamping means is elevated, means operable then to actuate the first named power operated means to lower said upper pin clamping means into pin clamping position, heading die means operable rectilinearly along the axis of said pin to form a head on said pin, actuating means operable thereafter in sequence first to operate the first named power operated means to elevate said upper pin clamping means and second to operate the second named power operated means to move said lower pin clamping means to its pin receiving position, and means for removing said pin from said lower clamping means after said first-named power operated means is elevated, including an ejector.

12. A pin heading machine including means supporting a row of pins, means for heating one end of each pin, relatively movable upper and lower pin clamping means having alignable pin receiving grooves cooperating to clamp a pin, power operated means for reciprocating said upper pin clamping means upwardly and downwardly, power operated means for reciprocating said lower pin clamping means between two extreme positions in one of which the pin receiving grooves of said upper and lower pin clamping means are in alignment and in the other of which the lower pin clamping means is in a position to receive a pin from said pin supporting means, power operated means for feeding one pin at a time from said pin supporting means to said lower pin clamping means while it is in said pin receiving position, means for actuating the second named power operated means to move it and a received pin from its pin receiving position to its position where the pin receiving groove thereof is in alignment with the pin receiving groove of the upper pin clamping means while said upper clamping means is elevated, means operable then to actuate the first named power operated means to lower said upper pin clamping means into pin clamping position, heading die means operable rectilinearly along the axis of said pin to form a head on said pin, actuating means operable thereafter in sequence first to operate the first named power operated means to elevate said upper pin clamping means and second to operate the second named power operated means to move said lower pin clamping means to its pin receiving position, mechanism operable while said lower pin clamping means is in the aligned groove position to push a pin upwardly with the upward elevating movement of said upper pin clamping means, and ejector means to strip a pin from the upper pin clamping means.

13. A pin heading machine including means supporting a row of pins, relatively movable upper and lower pin clamping means having alignable pin receiving grooves cooperating to clamp a pin, power operated means for reciprocating said upper pin clamping means upwardly and downwardly, power operated means for reciprocating said lower pin clamping means between two extreme positions in one of which the pin receiving grooves of said upper and lower pin clamping means are in alignment and in the other of which the lower pin clamping means is in a position to receive a pin from said pin supporting means, power operated means for feeding one pin at a time from said pin supporting means to said lower pin clamping means while it is in said pin receiving position, means for actuating the second named power operated means to move it and a received pin from its pin receiving position to its position where the pin receiving groove thereof is in alignment with the pin receiving groove of the upper pin clamping means while said upper clamping means is elevated, means operable then to actuate the first named power operated means to lower said upper pin clamping means into pin clamping position, heading die means operable rectilinearly along the axis of said pin to form a head on said pin, actuating means operable thereafter in sequence first to operate the first named power operated means to elevate said upper pin clamping means and second to operate the second named power operated means to move said lower pin clamping means to its pin receiving position, and means for removing said pin from said lower clamping means after said first-named power operated means is elevated, including an ejector.

FRED J. WRIGHT.

REFERENCES CITED

The following references are of record in the file of this patent:

UNITED STATES PATENTS

| Number | Name | Date |
|---|---|---|
| 59,464 | Seward | Nov. 6, 1866 |
| 1,766,484 | Clouse | June 24, 1930 |
| 1,835,598 | Hogberg | Dec. 8, 1931 |
| 2,288,643 | Purtell | July 7, 1942 |